United States Patent [19]
Yamaguchi

[11] Patent Number: 5,299,183
[45] Date of Patent: Mar. 29, 1994

[54] OPTICAL DATA RECORD/REPRODUCTION APPARATUS WITH TUBULAR COIL BODY

[75] Inventor: Shoji Yamaguchi, Ebina, Japan

[73] Assignee: Fuji Xerox Co., Ltd., Tokyo, Japan

[21] Appl. No.: 822,945

[22] Filed: Jan. 21, 1992

[30] Foreign Application Priority Data

Jan. 22, 1991 [JP] Japan .................................. 3-020288

[51] Int. Cl.⁵ ............................................. G11B 7/00
[52] U.S. Cl. ............................... 369/44.14; 369/44.16; 369/249
[58] Field of Search .................. 369/112, 44.14, 44.15, 369/44.16, 44.21, 44.22, 247, 244, 249, 253

[56] References Cited

U.S. PATENT DOCUMENTS

| | | | |
|---|---|---|---|
| 4,643,522 | 2/1987 | Takashima | 369/44.15 |
| 4,766,584 | 8/1988 | Sekimoto et al. | 369/44.15 |
| 4,862,441 | 8/1989 | Yumura et al. | 369/44.15 |
| 4,927,235 | 5/1990 | Narumi | 369/44.15 |
| 4,958,335 | 9/1990 | Takeda et al. | 369/44.14 |
| 5,097,456 | 3/1992 | Tanoshima et al. | 369/44.14 |
| 5,218,587 | 6/1993 | Nomiyama | 369/44.16 |

*Primary Examiner*—Aristotelis Psitos
*Assistant Examiner*—Nabil Hindi
*Attorney, Agent, or Firm*—Finnegan, Henderson, Farabow, Garrett & Dunner

[57] ABSTRACT

Optical data record/reproduction apparatus which records and reproduces data to and from a record medium by moving a movable portion of an optical head including a reflecting member, a condenser lens, and the like, in the track direction of the optical record medium by drive unit. An adiabatic member is placed in the junction area between the movable portion and a tubular drive coil constituting the drive unit to move the movable portion in the track direction.

19 Claims, 12 Drawing Sheets

FIG. 9(A)
FIG. 9(B)
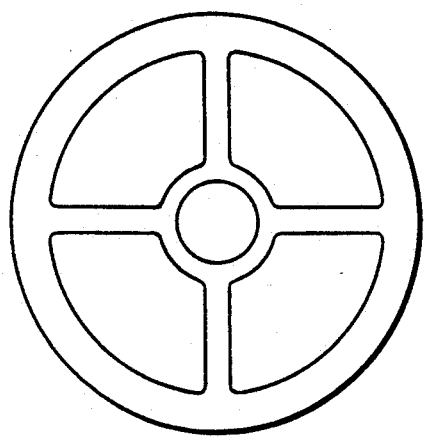
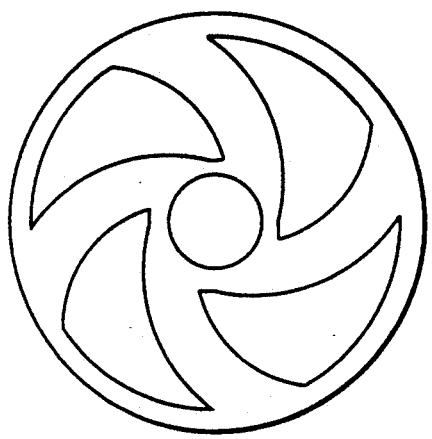
FIG. 9(C)
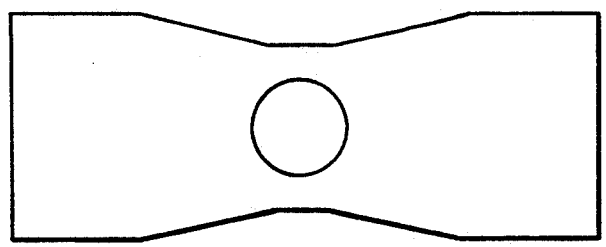

(PRIOR ART)

(PRIOR ART)

(PRIOR ART)

OPTICAL DATA RECORD/REPRODUCTION APPARATUS WITH TUBULAR COIL BODY

BACKGROUND OF THE INVENTION

The present invention relates to an optical data record/reproduction apparatus which records and reproduces data into and from an optical record medium, such as an optical disk or an opto-magnetic disk, or which records, reproduces, and erases data to, from and in the optical record medium. More particularly, the invention relates to an optical data record/reproduction apparatus of which the optical head is capable of being moved accurately and at high speed.

An optical data record/reproduction apparatus as shown in FIG. 16, has been known in the art of record/reproduction apparatus. As shown, the optical data record/reproduction apparatus is provided with a light source "a", such as a semiconductor laser; a collimator "b" for converting diffusion laser light emitted from the light source "a" into parallel beams of laser light; a beam shaping prism "c" for shaping the spot shape of the laser beam from an elliptic shape to a substantially circular shape; a beam splitter "e" for splitting an incident laser beam to be incident on an optical record medium "d" and a reflected laser beam reflected by the optical record medium "d", one from the other; a ¼λ plate "f" for transforming the laser beam of linear polarization emanating from the beam splitter "e" into a laser beam of circular polarization; an objective lens "g", movably installed, for focusing the laser beams after passing through the ¼λ plate "f" at the focal plane on the optical record medium "d"; and a cylindrical lens "j" for directing the reflected laser beam split by the beam splitter "e" toward a quartered PIN photo diode "h" for producing a tracking error signal, a focusing error signal, and a reproduced RF signal.

In the optical data record/reproduction apparatus, data is recorded in the optical record medium "d" in a spiral fashion or a concentric circular fashion. To reproduce the stored data, an optical head incorporating an optical system thereinto, which includes the objective lens "g", for example, is moved in the radial direction of the optical record medium "d" (i.e., in the track direction). To cope with the problem of, for example, the plane inclination of the optical record medium "d", the optical head is moved in the direction orthogonal to the optical record medium "d" (i.e., in the focus direction). To realize this orthogonal movement, a drive system to be set forth below is used.

An example of the drive system will be described with reference to FIGS. 17 and 18. The drive system is provided with a movable table k1 shaped like an H in cross section; a linear bearing k3 and a carriage k2; paired bobbins k4 and k5; magnetic yokes k6 and k7; paired permanent magnets for track control m1, m2, and m3, m4, focus control permanent magnets m5 and m6; and magnetic holders k8. The movable table k1 is disposed near the optical record medium "d" and carries an optical head He thereon, which includes a focus control drive coil p1. The carriage k2, provided on the lower surface of the movable table k1, cooperates with the linear bearing k3 to movably support the movable table k1. The paired bobbins k4 and k5 are respectively provided on either side of the movable table k1 and have drive coils p2 for track control, which are respectively wound around the bobbins. The magnetic yokes k6 and k7 are respectively inserted into the tubular portions of the bobbins k4 and k5. For track control, paired permanent magnets m1, m2 and m3, m4 are respectively provided above and under the bobbins k4 and k5. The focus control permanent magnets m5 and m6 are disposed extending in the longitudinal direction of the permanent magnets m1 to m4. The magnetic holders k8 hold the permanent magnets m1 to m6. In the record/reproduction apparatus thus constructed, for the focus control, the optical head He is moved in the focus direction by an electromagnetic force developed when current is fed to the drive coil p1. For track control, the optical head He carried on the movable table k1 is moved in the direction of an arrow A by the electromagnetic force developed from each drive coil p2 when current is fed to a drive coils p2.

Another example of the conventional optical data record/reproduction apparatus is shown in FIG. 19. The record/reproduction apparatus is comprised of an optical head He, which is disposed near the optical record medium "d" and is configured to float by an air stream produced when the optical record medium "d" rotates. The record/reproduction apparatus of FIG. 19 includes a flat-spring like suspension n1 for supporting the optical head in a floating state, and a moving member n3 which supports the base end of the suspension n1 and is moved by a drive unit n2. In the apparatus, for track control, the optical head He is moved in the track direction by the moving member n3. For focus control, the floating action of the optical head He is used.

The optical data record/reproduction apparatus of FIGS. 17 and 18, formerly described, is constructed so as to perform the focus control by utilizing the focus control drive coil pl. Accordingly, the control system is complicated. Also in the apparatus, as shown in FIG. 18, the optical head He is disposed at a location apart from the drive source "k", which is made up of the movable table k1, carriage k2, bobbins k4 and k5, magnetic yokes k6 and k7, and the like. Accordingly, in operation, a moment tends to act on the optical head He. This makes the track control instable.

The optical data record/reproduction apparatus of FIG. 19 utilizes the floating action of the optical head He for the focus control. Accordingly, the control system is simplified in construction. However, also in the apparatus, the optical head He is disposed at a location apart from the drive source "n", which is made up of the drive unit n2, the moving member n3, and the like, in a manner that it is suspended from the drive source by means of the suspension n1. Accordingly, in operation, a moment also tends to act on the optical head He of FIG. 19. Hence, the apparatus of FIG. 19 also suffers from instability in track control.

To solve those problems, an optical data record/reproduction apparatus, as will be given below, has been proposed.

A proposed record/reproduction apparatus, as shown in FIGS. 20 through 22, is provided with a carriage q3 and a linear bearing q4, a pair of magnetic yokes q5 and q6, a drive unit "q" with permanent magnets q7 and q8, and an optical head He.

The carriage q3 and a linear bearing q4 are disposed under first and second movable members r1 and r2 located near the optical record medium. Each of the members is shaped like a tube with an elliptic cross section and consists of a drive coil q1 for track control and a bobbin q2 with a coil q1 wound therearound. The magnetic yokes q5 and q6 are respectively inserted through the tubes of the first and second movable members r1 and r2 and extended in the radial direction of the optical record medium. The drive unit "q" includes permanent magnets q7 and q8 which are disposed in the vicinity of the magnetic yokes q5 and q6 and extended in the longitudinal direction of the yokes. The optical head He is supported by resilient support member "s" extended between the first and second movable members r1 and r2. The head is caused to float by an air stream produced when the optical record medium rotates, and focuses converted light from a light source at the focal plane of the optical record medium. The optical head He is moved in the track direction when the first and second movable members r1 and r2 are moved by an electromagnetic force developed from the drive coil q1 when it is fed with current.

In the optical data record/reproduction apparatus, the floating action of the optical head He is utilized for focus control. This feature simplifies the control system. In the construction of the apparatus, the optical head He is disposed between the first and second movable members r1 and r2. This feature allows the optical head He to be disposed near the drive center. A moment acting on the optical head He is reduced, thereby stabling the track control.

The record/reproduction apparatuses as described above have the following problems, however. In the case of the apparatus shown in FIG. 20, to move the optical head He in the track direction of the optical record medium "d", a linear motor is driven, which, is made up of the drive coil q1 for track control, permanent magnets q7 and q8, and the like. At this time, current is fed to the drive coil q1, so that heat is generated in the coil. The generated heat is transferred through the resilient support member "s" to the optical head He and through the movable members r1 and r2 to the carriage q3. Accordingly, the head movable portion connected to the coil q1 tends to displace. Accordingly, the frequency characteristic when the optical head He is moved in the track direction of the optical record medium "d" deteriorates as shown in FIG. 23. This makes it difficult to control the optical head highly accurately. Accordingly, it is difficult to move the optical head He to a predetermined position quickly and accurately.

In the case of the record/reproduction apparatus shown in FIG. 19, the focus control is performed utilizing the air stream acting on the optical head He. This provides a simplified control system. The optical head He is mounted, by means of the flat-spring like suspension n1, at a location apart from the drive source including the drive unit n2, the moving member n3, and the like. With this construction, when the optical head He is moved, a moment acts on the optical head He, thereby hindering quick and accurate movement of the optical head to a desired position.

In the case of record/reproduction apparatus shown in FIGS. 20 and 21, the drive coil, the bearing, and the floating section are directly coupled with one another. Therefore, the heat generated in the drive coil owing to the current passage therethrough is transferred to the bearing and the floating section, possibly deteriorating the vibration characteristic of the optical head.

SUMMARY OF THE INVENTION

With the view of overcoming the problems of the prior art, the present invention has as an object to provide an optical data record/reproduction apparatus which can move the optical head accurately and at high speed, and which can realize a light weight and efficient assembly of the optical head.

As a first aspect of the present invention, there is provided an optical data record/reproduction apparatus of the type which records and reproduces data to and from a record medium by moving a movable portion of an optical head including a reflecting member, a condenser lens, and the like, in the track direction of the optical record medium by means of a drive means. Further, an adiabatic member is placed in the junction area between the movable portion and a drive coil constituting the drive means to move the movable portion in the track direction.

In the optical data record/reproduction apparatus of the present invention, the coefficient of thermal expansion of the drive coil is substantially equal to that of the adiabatic member.

A second embodiment of the present invention also includes an optical data record/reproduction apparatus of the type which records and reproduces data to and from a record medium by moving a movable portion of an optical head including a reflecting member, a condenser lens, and the like, in the track direction of the optical record medium by means of a drive means. The second embodiment has a part of the drive coil constituting the drive means to move the movable portion in the track direction which is constructed with a dual body structure. Openings are formed in the side of the drive coil which faces the optical record medium, and in the side of the coil which faces the bearing member serving as a guide for the movement of the movable portion.

In the optical data record/reproduction apparatus of the present invention, a condenser lens is mounted, by a resilient support, at an opening portion of the drive coil which faces the optical record medium, and a reflecting member for reflecting a laser beam emitted from a light source toward the optical record medium is disposed in the opening portion of the drive coil, which faces the bearing.

In the optical data record/reproduction apparatus of the present invention, the reflecting member is directly bonded to the bearing member.

Further in the optical data record/reproduction apparatus of the present invention, a sunk portion is formed in an area of the bearing member where the reflecting member is to be mounted.

A third aspect of the present invention includes an optical data record/reproduction apparatus of the type which records and reproduces data to and from a record medium by moving a movable portion of an optical head including a reflecting member, a condenser lens, and the like, in the track direction of the optical record medium by means of a drive means, wherein a linear motion bearing is used to guide the movable portion in the track direction.

In the optical data record/reproduction apparatus of the present invention, the movable member of the linear motion bearing is made of light alloy.

Alternatively, in the optical data record/reproduction apparatus of the present invention, the movable member of the linear motion bearing may be made of inorganic material.

In the optical data record/reproduction apparatus of the present invention, a gap is formed in the movable portion of the linear motion bearing.

In the optical data record/reproduction apparatus of the present invention, a thin film of metal, for example, is applied to the contact area of the movable portion of the linear motion bearing where the movable portion comes in contact with steel balls.

According to the present invention, the portion of the optical head where the condenser lens is mounted is made of a material which can substantially float when it receives an air stream caused by the rotation of the optical record medium. At least the bottom surface of the floating portion is smoothed in order to effectively receive the floating pressure from the optical record medium. The member to cause the condenser-lens-mounted portion of the optical head to float may be made of ceramics, amorphous carbon, or the like.

In the present invention, when the floating member is mounted on the optical head by a flat spring, a support position of the support member for supporting the floating member in a manner that it is movable in the track direction, and a position to mount the flat spring, to which the floating member is bonded, both lie in the center portion in the moving direction of the optical head.

According to the present invention, an adiabatic member is placed in the junction area between the movable portion and a drive coil constituting the drive means for moving the movable portion in the track direction. With the adiabatic member, the heat generated from the current-fed drive coil is prevented from being transferred to the remaining part of the movable portion. Accordingly, the optical head movable part coupled with the drive coil will not be displaced. The resultant record/reproduction apparatus can position the optical head accurately and at high speed.

According to the present invention, a part of the drive coil constituting the drive means for moving the movable portion in the track direction is constructed with a dual body structure, and openings are formed in the side of the drive coil which faces the optical record medium, and in the side of the coil which faces the bearing member serving as a guide for the movement of the movable portion. With such a construction, a reflecting member, a condenser lens, and the like may be disposed in the central portion of the movable portion. When the movable portion moves, no moment acts on the optical head. This enables the optical head to move to an intended position on the optical record medium accurately and quickly.

According to the present invention, a linear motion bearing is used to guide the movable portion in the track direction. Therefore, the guide for moving the movable portion in the track direction is simplified in construction. A decreased number of bearing members may be used, to provide the light weight and efficient assembly of the optical head.

BRIEF DESCRIPTION OF THE DRAWINGS

FIGS. 9(A) through 9(C) are plan views showing other flat springs for use in the optical data record/reproduction apparatus;

DETAILED DESCRIPTION OF THE PREFERRED EMBODIMENTS

Preferred embodiments of the present invention will be described with reference to the accompanying drawings.

An optical data record/reproduction apparatus according to an embodiment of the present invention, as shown in FIGS. 1 through 4, is comprised of an optical head 2 disposed near an optical disk 1, which operates as an optical record medium, and a drive unit 3 for moving optical head 2 in the radial direction of the optical disk 1.

Figure 5:
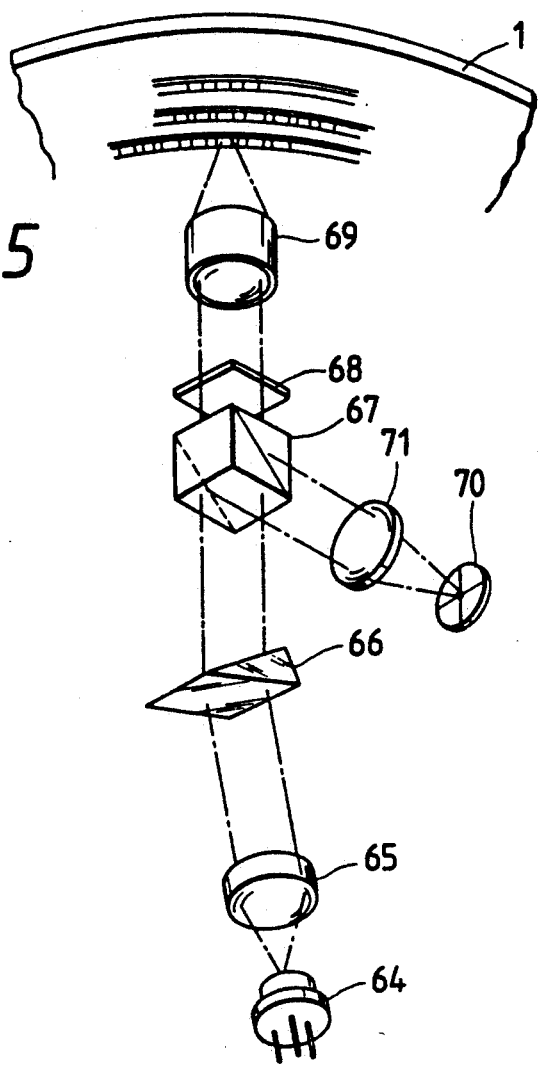
FIG. 5 is a perspective view showing an optical system of the optical data record/reproduction apparatus of the present invention.
Figure 6:
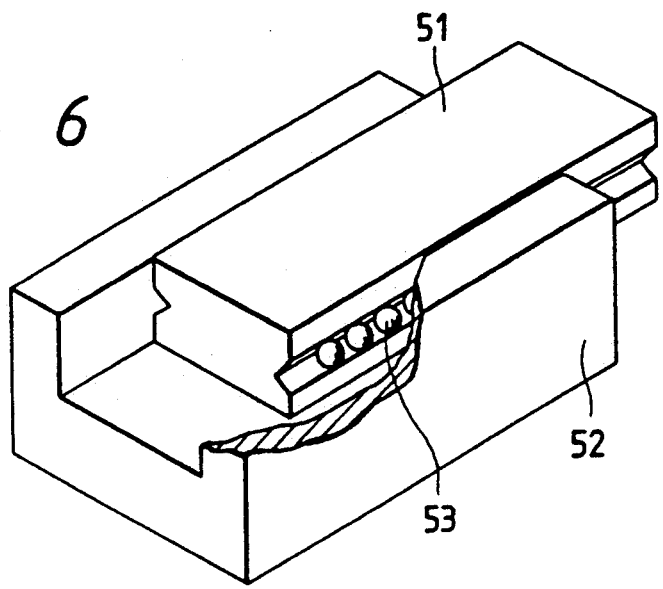
FIG. 6 is a perspective view showing a linear slide bearing used in the optical data record/reproduction apparatus of FIG. 1.

The optical system of the optical data record/reproduction apparatus, as shown in FIG. 5, is comprised of a semiconductor laser 64 acting as a light source; a collimator lens 65 for converting diffusion laser light emitted from the semiconductor laser 64 into parallel beams of laser light; a beam shaping prism 66 for shaping the spot shape of the laser beam from an elliptic shape to a substantially circular shape; a beam splitter 67 for splitting an incident laser beam to be incident on an optical disk 1 and a reflected laser beam reflected by the optical disk 1, one from the other; a ¼λ plate 68 for transforming the laser beam of linear polarization emanating from the beam splitter 67 into a laser beam of circular polarization; an objective lens 69, movably installed, for focusing the laser beams after passing through the ¼λ plate 68 at the focal plane on the optical disk 1; and a cylindrical lens 71 for directing the reflected laser beam split by the beam splitter 67 toward a quartered PIN photo diode 70 for producing a tracking error signal, a focusing error signal, and a reproduced RF signal.

In the optical data record/reproduction apparatus, data is recorded in the surface of the optical disk 1 in a spiral fashion or a concentric circular fashion. To reproduce the stored data, an optical head incorporating an optical system thereinto, which includes the objective lens 69, for example, is moved by the drive unit 3 in the radial direction of the optical disk 1 (i.e., in the track direction).

The optical head 2 is provided with a floating body 22 made of alumina ceramics and an objective lens 69 made of plastic. The floating body 22 is caused to float by an air stream produced when the optical disk 1 rotates. An opening 21 for providing an optical path for guiding a laser beam from the semiconductor laser 64 toward the optical disk 1 is formed in the floating body 22. The objective lens 69 focuses the laser beam, which is emitted from the semiconductor laser 64 mounted at the opening 21 of the floating body 22, at the focal plane of the optical disk 1. Tapered parts 24 and 25, which are used to secure the smooth inflow and outflow of air, are formed in the air inflow and outflow portions on the surface of the floating body 22, which faces the optical disk 1. An air escape 26, which is provided for stabilizing the floating movement of the optical head 2, is provided in the central part of the floating body 22.

The drive unit 3 is comprised of a movable body 4; a carriage 51 made of aluminum and a linear bearing 52; a pair of pure iron yokes 61 and 62; arcuate magnets 71 and 72; a holder 73; and a magnetic fixing table 74. The movable body 4 is formed with a bobbinless drive coil 40 as formed in a manner such that a number of turns of wire are united by epoxy adhesive into a single piece. The carriage 51 and the linear bearing 52 are mounted on the bottom of the movable body 4. The magnetic yokes 61 and 62 are respectively inserted into yoke receiving portions 41 of the movable body 4 in the track direction of the optical disk 1. The arcuate magnets 71 and 72, as permanent magnets made of rare earth iron, are disposed in the longitudinal direction of the yokes 61 and 62. The holder 73 is provided for holding those magnets 71 and 72. The fixing table 74 made of pure iron, supports all of the constituent components including the carriage 51 and the linear bearing 52, for example.

The surface of the carriage 51, on which the carriage contacts with the linear bearing 52, is coated with a hard thin film made of chromium metal, for example, for durability improvement. Further, bearings 53 are fitted in the side surfaces for frictional force reduction purposes.

Figure 2:
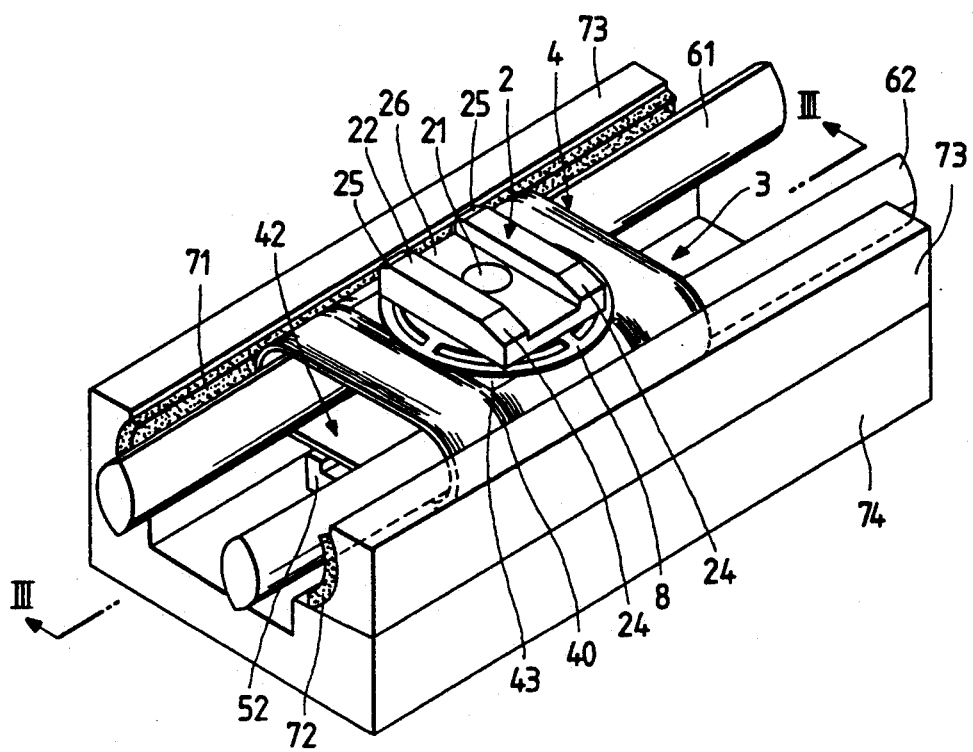
FIG. 2 is a perspective view showing the optical data record/reproduction apparatus of FIG. 1.
Figure 3:
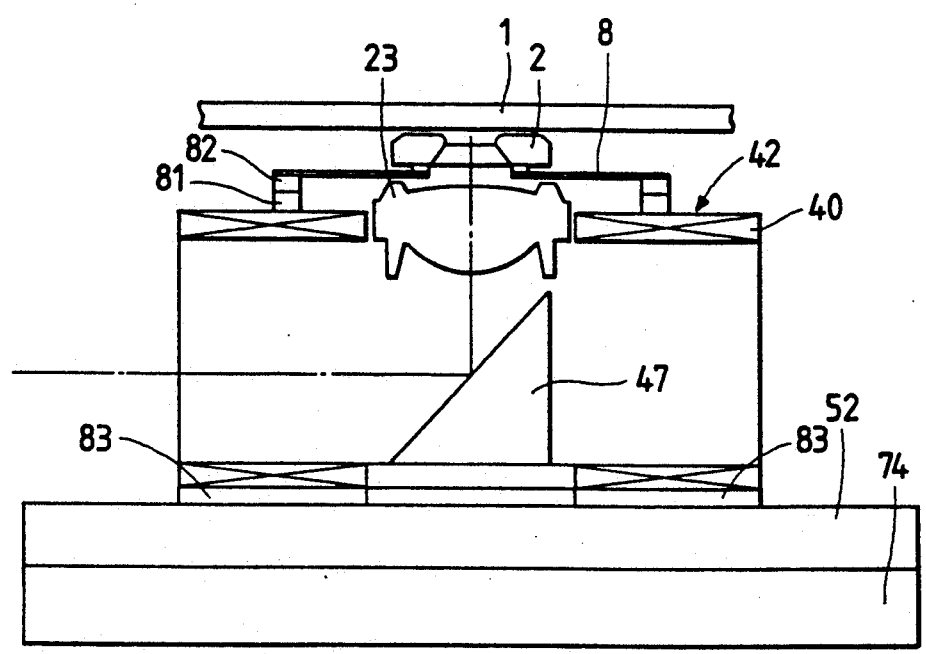
FIG. 3 is a longitudinal sectional view showing the optical data record/reproduction apparatus of FIG. 1.
Figure 4:
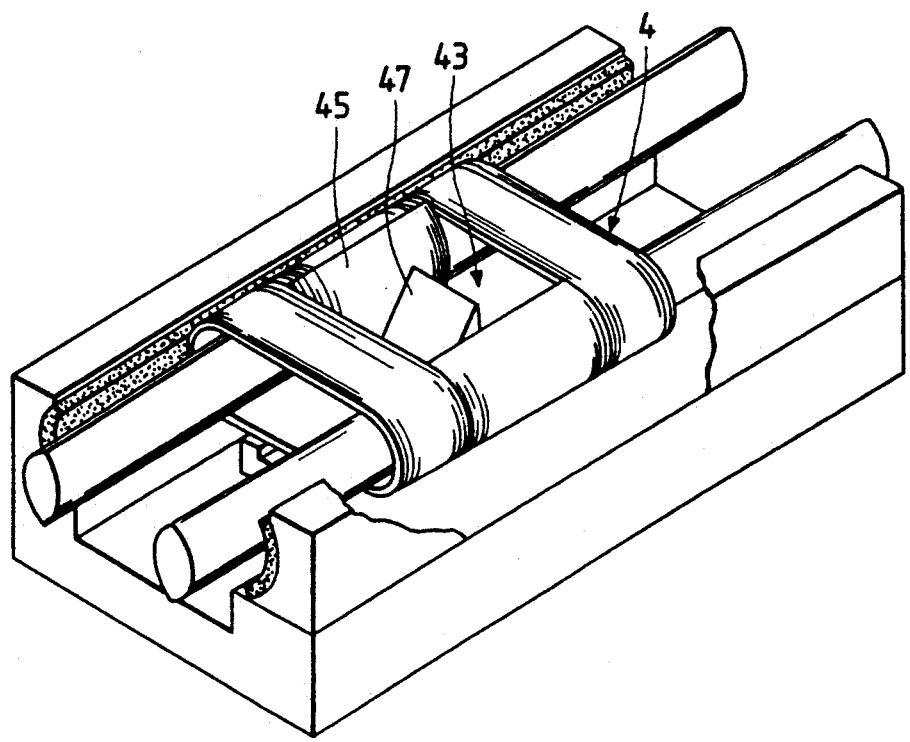
FIG. 4 is a partially broken, perspective view of the optical data record/reproduction apparatus of FIG. 1.

The movable body 4, as shown in FIGS. 2 and 3, includes a coil body 42 shaped like an elliptic tube and a pair of reinforcing coil walls 45 and 46. A substantially square opening 43 is formed in the side of the coil body 42 which faces the optical disk 1. The reinforcing coil walls 45 and 46, in cooperation with the inner walls 44 of the coil body 42, form respectively the yoke receiving portions 41 for receiving the yokes 61 and 62. A prism 47 is disposed on the inner wall of the coil body 42, which faces the opening 43. The prism 47 guides a laser beam emitted from the semiconductor laser toward the optical disk 1.

Figure 1:
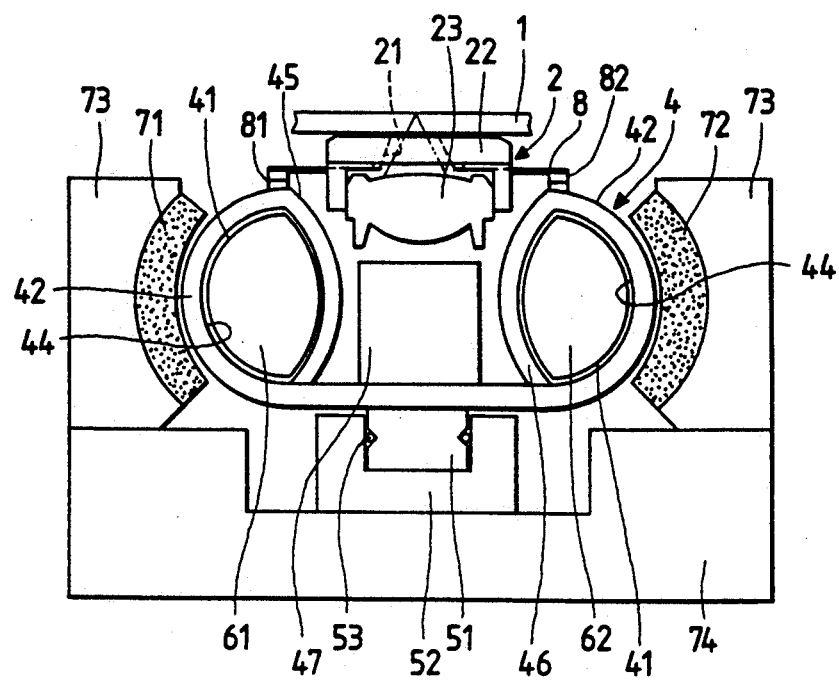
FIG. 1 is a cross sectional area of an embodiment of an optical data record/reproduction apparatus according to the present invention.

As shown in FIG. 1, a shape of the cross section of each of inner walls 44 of the coil body 42 is arcuate to provide a radius of curvature substantially equal to that of each of the circular magnets 71 and 72. With the arcuate shape, the inner walls can effectively receive the lines of magnetic force. A shape of the cross section of each of the reinforcing coil walls 45 and 46 is arcuate to provide a radius of curvature larger than that of the inner wall 44, thereby eliminating a useless space within the coil body 42.

Figure 7:
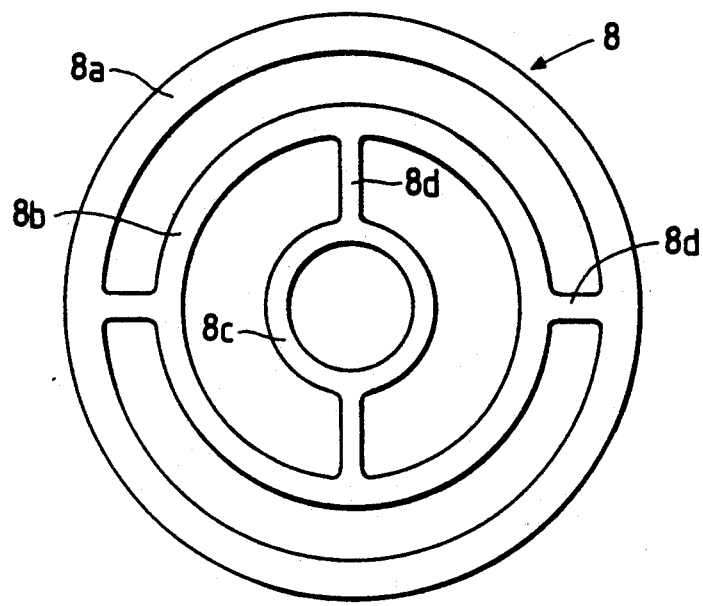
FIG. 7 is a plan view showing a flat spring used in the optical data record/reproduction apparatus.

A spring member 8 made of phosphorus bronze, shown in FIG. 7, is mounted at the opening 43 of the coil body 42. The optical head 2 is mounted to the opening 43 through the spring member 8. Thus, the manufacturing of the optical data record/reproduction apparatus is completed.

It is noted here that in the present embodiment, an adiabatic member is placed in the junction area between the movable portion and the drive coil constituting drive means which enables the movable portion to move in the track direction.

As shown in FIG. 1, the spring member 8, which is shaped to be circular in plan is fixed to the drive coil with a ring-like mounting member 81 inserted therebetween. The spring member 8, as shown in FIG. 7, consists of three coaxially disposed rings, i.e., inner, medium and outer rings 8c, 8b, and 8a, respectively. Those rings 8a through 8c are connected by two pairs of coupling members 8d extending in radial directions. One pair of coupling members is directed to be orthogonal to the other pair. The diameter of the mounting member 81 is substantially equal to that of the outer ring 8a of the spring member 8, and fixed to the circumferential edge portion of the spring member 8.

An adiabatic member 82 is placed between the ring-like mounting member and the drive coil, and bonded to them by suitable adhesive. The adiabatic member 82 is similar in shape to the ring-like mounting member, and is made of material of which the coefficient of thermal expansion is substantially equal to that of the drive coil.

Figure 8:
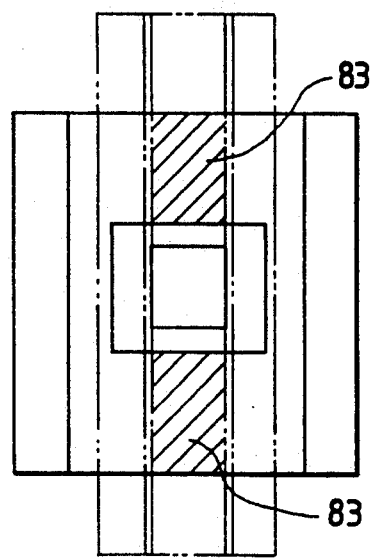
FIG. 8 is a partially broken, plan view showing the optical data record/reproduction apparatus of the present invention.

As shown in FIG. 8, another adiabatic member 83, shaped to be rectangular in plan, is inserted between the drive coil and the carriage 51, and fixed to them by suitable adhesive.

Also in the optical data record/reproduction apparatus thus constructed, as in the conventional one, the movable body is moved in the track direction of the optical disk by the electromagnetic force generated from the drive coil when it is fed with current. With the movement of the movable body, the optical head is moved for track control. For focus control, the floating action of the optical disk is utilized. Thus, the drive system of the record/reproduction apparatus is simplified.

Further, the drive coil of the apparatus is of the bobbinless type. Therefore, the weight of the movable body is correspondingly reduced.

The total weight of the movable portion of the preferred embodiment including the optical head, is 4 g or less, as set forth below, and is reduced by 60% when comparing with that of the conventional apparatus.

Optical head: 0.3 g
Drive coil: 1.8 g
Prism: 0.3 g
Mounting pieces including the spring member: 0.7 g In the record/reproduction apparatus of the embodiment, the pair of reinforcing coil walls 45 and 46 are provided in the portion where the opening 43 is formed in the coil body 42, thus increasing the rigidity of the coil body 42. Further, the coil body 42, and the coil for the reinforcing coil walls 45 and 46 are also present in the opening 43 formed portion. Therefore, the electromagnetic force developed from the drive coil when it receives current is increased.

The prism 47, which is provided for guiding a laser beam emitted from the semiconductor laser toward the optical disk 1, is disposed on the inner wall of the coil body 42 which faces the opening 43. Further, the optical head 2 is mounted to the opening 43 of the coil body 42, through the spring member 8. Accordingly, the mounting location of the optical head 2 lies near the drive center of the movable body 4. This feature reduces a moment acting on the optical head 2 when it moves.

As seen from the foregoing description of the record/reproduction apparatus of the invention, high rigidity and reduced weight of the movable body 4 are realized. The electromagnetic force generated by the drive coil when it receives current is increased. The moment acting on the optical head 2 when it moves is reduced. A stable and high speed movement of the optical head 2 is realized, leading to reduction of access time.

The spring member 8 used for mounting the optical head 2 may take any shape, so long as it can support the optical head 2 in a floating state and it will not intercept the laser beam from the light source. The spring member 8 of FIG. 7 may be substituted by any of the spring members shown in FIGS. 9(A) to 9(C). Use of the spring member 9(B) provides a uniform support of the optical head 1, stabilizing the floating movement of the head 2. In the work of mounting the spring member 8, a minute adjustment of the member is possible by adjusting the spirality of the spring member 8. This fact implies that the mounting work is simplified.

In the present embodiment, the adiabatic member is placed in the junction between the movable portion and the drive coil constituting the drive means to enable the movable portion to move in the track direction. The adiabatic member extremely impedes the heat generated from the current-fed drive coil, which normally would be transferred to the remaining part of the movable portion. Accordingly, the optical head coupled with the drive coil will not displace. The resultant record/reproduction apparatus can position the optical head accurately and at high speed.

2nd Embodiment

Figure 10:
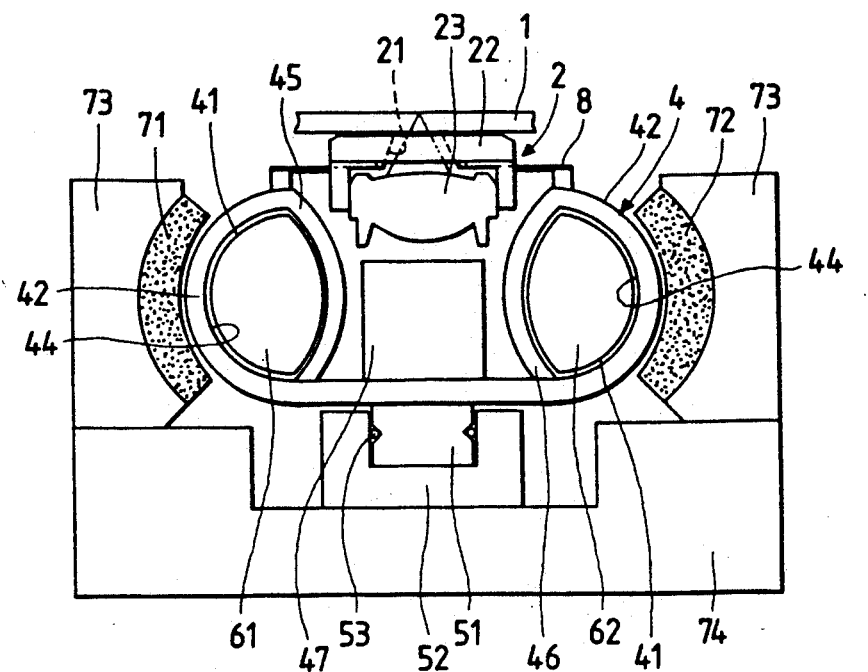
FIG. 10 is a cross sectional area of another embodiment of an optical data record/reproduction apparatus according to the present invention.

FIG. 10 is a sectional view showing a second embodiment of an optical data record/reproduction apparatus according to the present invention. For simplicity, like reference numerals are used for designating like or equivalent portions in the first embodiment. In the second embodiment, a part of the drive coil constituting the drive means to move the movable portion in the track direction is constructed with a dual body structure. An opening is formed in the side of the drive coil which faces the optical record medium. Another opening is formed in the side of the coil which faces the bearing member serving as a guide for the movement of the movable portion.

The movable body 4, as described above and shown in FIGS. 10 and 11, includes a coil body 42 shaped like an elliptic tube and a pair of reinforcing coil walls 45 and 46. A substantially square opening 43 is formed in the side of the coil body 42 which faces the optical disk 1. The reinforcing coil walls 45 and 46, in cooperation with the inner walls 44 of the coil body 42, form respective yoke receiving portions 41 for receiving the yokes 61 and 62.

Figure 11:
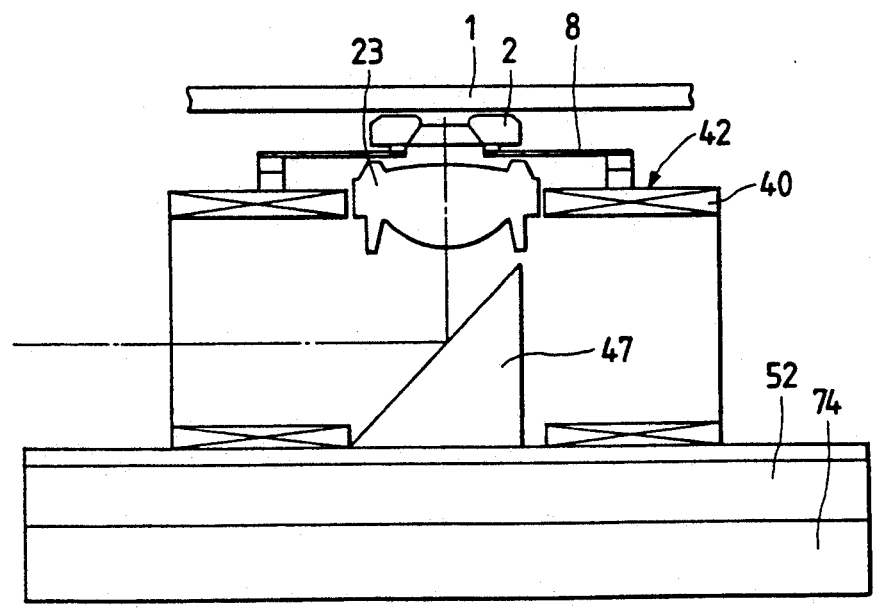
FIG. 11 is a longitudinal sectional view showing the optical data record/reproduction apparatus of FIG. 10.
Figure 12:
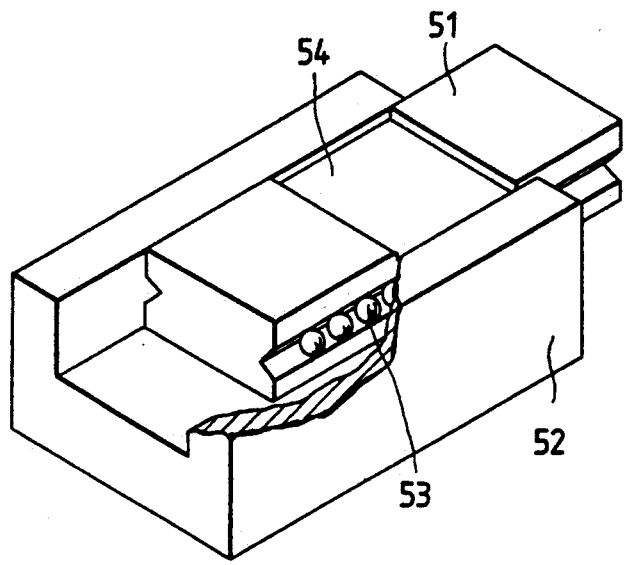
FIG. 12 is a perspective view showing a linear slide bearing used in the optical data record/reproduction apparatus of FIG. 10.

A prism 47 is disposed in the opening formed in the side of the drive coil which faces the linear bearing 52. The prism 47 guides a laser beam emitted from the semiconductor laser toward the optical disk 1. The prism 7, as shown in FIG. 11, is directly bonded to the carriage 51. A portion of the carriage 51 where the prism 7 is sunk, as shown in FIG. 12. The sunk portion 54 makes it easy to position and mount the prism 7.

As described above, the drive coil, which constitutes the drive means for moving the movable portion in the track direction, contains the dual body structure. The openings are formed in the side of the drive coil which faces the optical record medium, and in the side of the coil which faces the bearing member serving as a guide for the movement of the movable portion. With such a construction, a reflecting member, a condenser lens, and the like may be disposed in the central portion of the movable portion. When the movable portion moves, no moment acts on the optical head. This enables the optical to move to an intended position accurately and quickly.

3rd Embodiment

Figure 13:
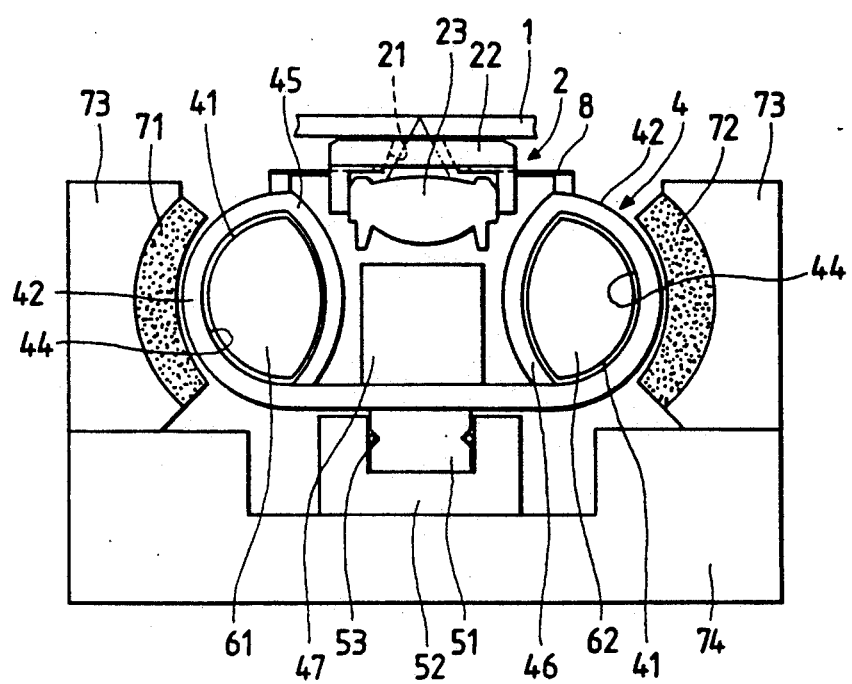
FIG. 13 is a cross sectional area of yet another embodiment of an optical data record/reproduction apparatus according to the present invention.

FIG. 13 is a sectional view showing a third embodiment of an optical data record/reproduction apparatus according to the present invention. For simplicity, like reference numerals are used for designating like or equivalent portions in the first embodiment. In the third embodiment, a linear motion bearing is used to guide movement of the movable portion in the track direction.

Figure 14:
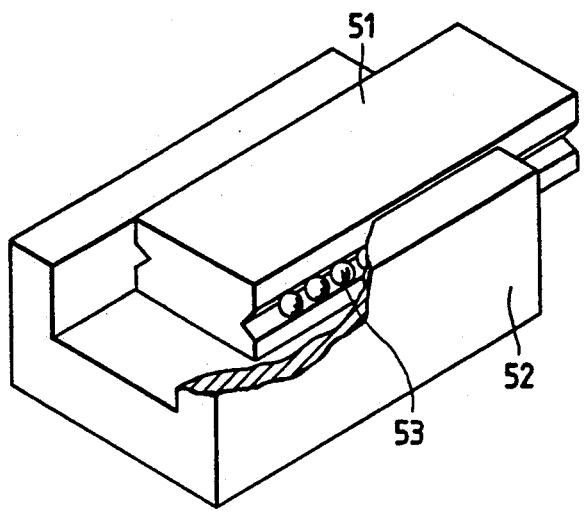
FIG. 14 is a perspective view showing a linear slide bearing used in the optical data record/reproduction apparatus of FIG. 13.

As stated above and shown in FIG. 13, the movable body 4 of the optical head is mounted on the carriage 51, which is received by the linear slide baring 52. The movable portion of the carriage 51 coupled with the linear slide bearing 52 as shown in FIG. 14, is made of light alloy of low specific gravity, such as aluminum, thereby to reduce the weight of the optical head movable portion. Inorganic material, such as ceramics, in addition to the light alloy, may be used for the movable portion of the carriage 51 for the linear motion bearing, also for realizing a light and durable bearing.

The area of the carriage 51 where the carriage comes in contact with steel balls is coated with a thin film made of chromium, thereby to realize light weight and good durability of the carriage.

Figure 15:
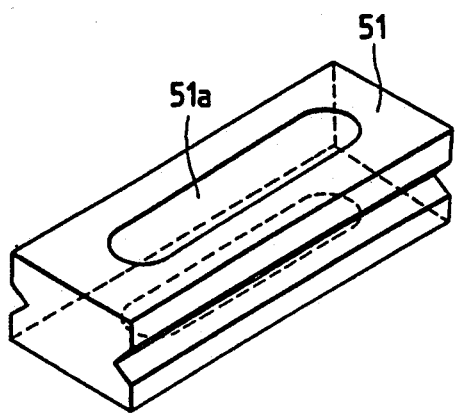
FIG. 15 is a perspective view showing another example of a linear slide bearing used in the optical data record/reproduction apparatus of FIG. 13.
Figure 16:
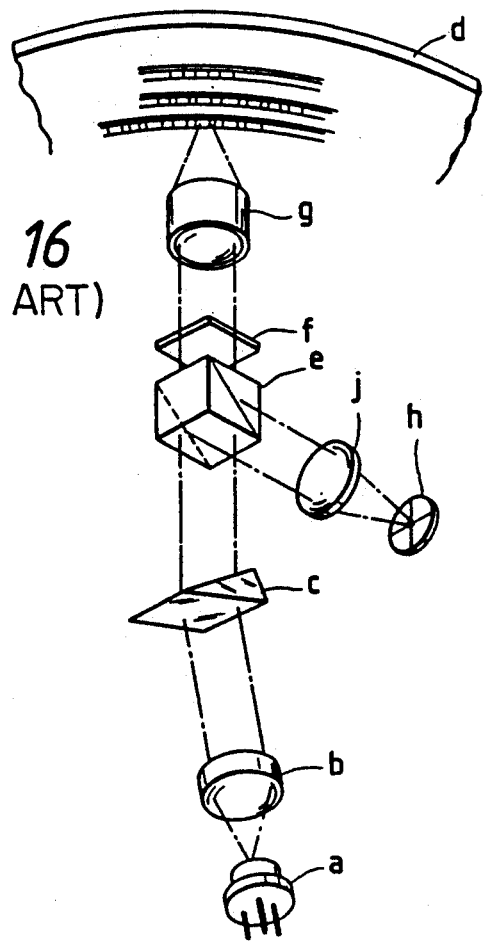
FIG. 16 is a perspective view showing an optical system of a conventional optical data record/reproduction apparatus.
Figure 17:
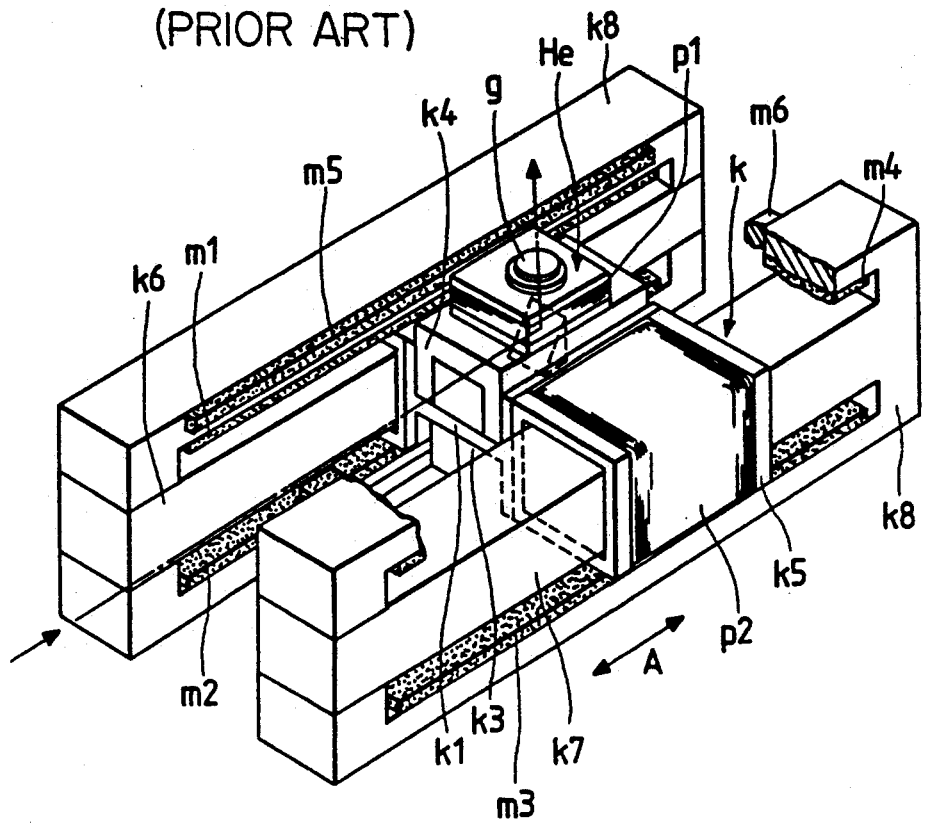
FIG. 17 is a perspective view showing the optical data record/reproduction apparatus of FIG. 16.
Figure 18:
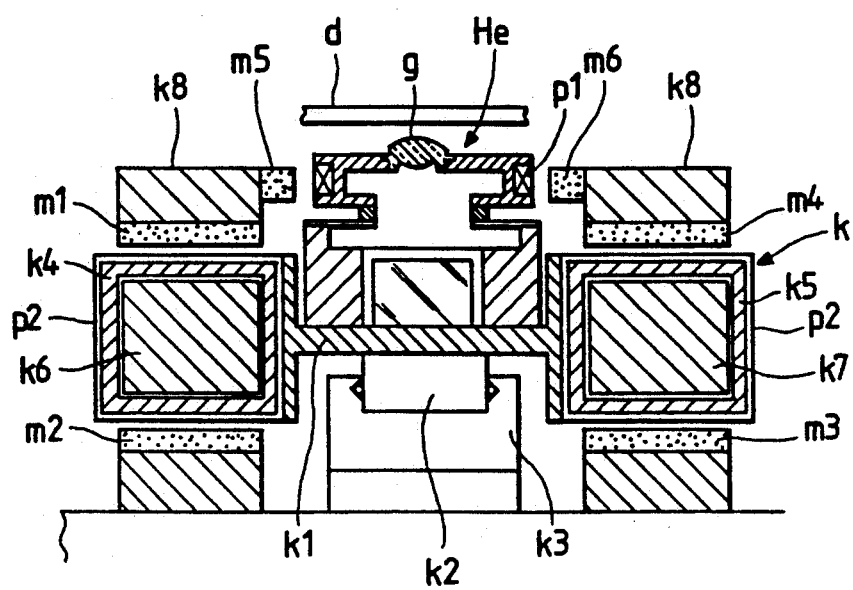
FIG. 18 is a cross sectional view showing the conventional optical data record/reproduction apparatus.
Figure 19:
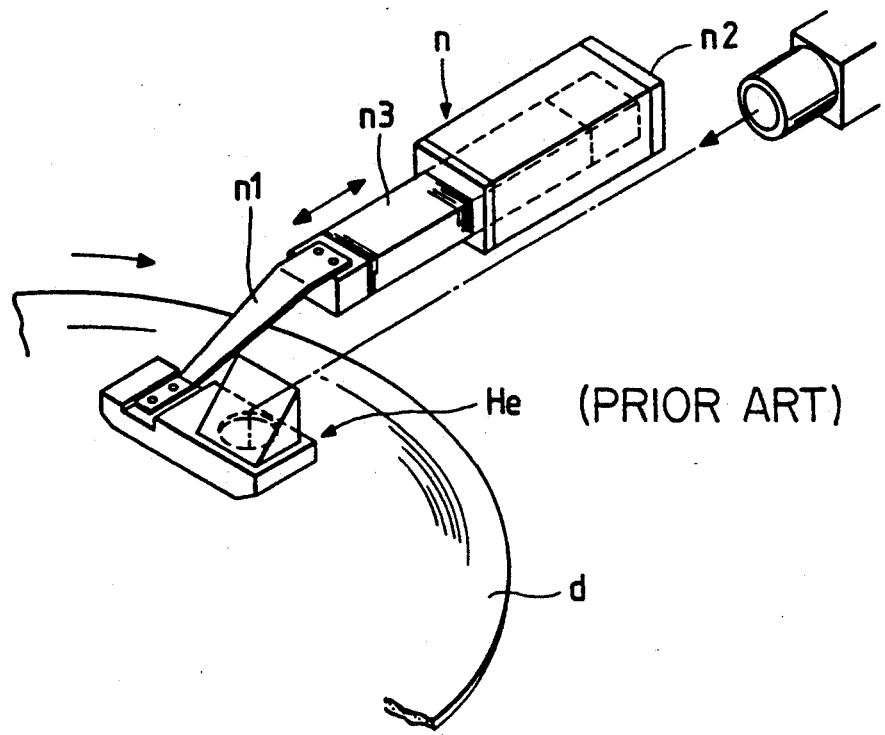
FIG. 19 is a perspective view showing an optical system of another conventional optical data record/reproduction apparatus.
Figure 20:
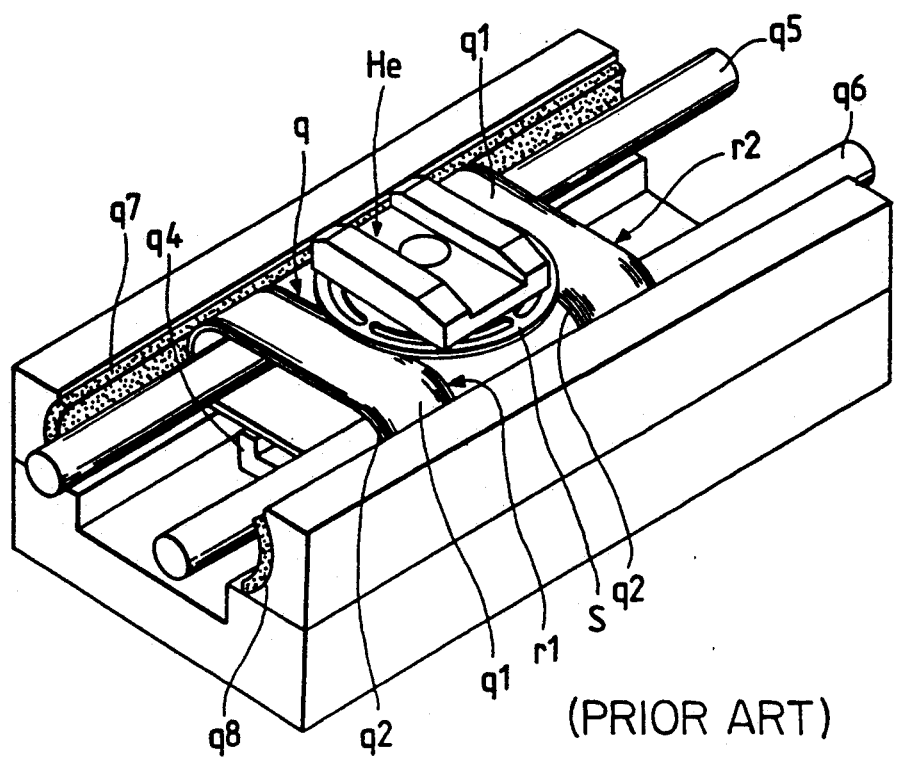
FIG. 20 is a perspective view showing an optical system of still another conventional optical data record/reproduction apparatus.
Figure 21:
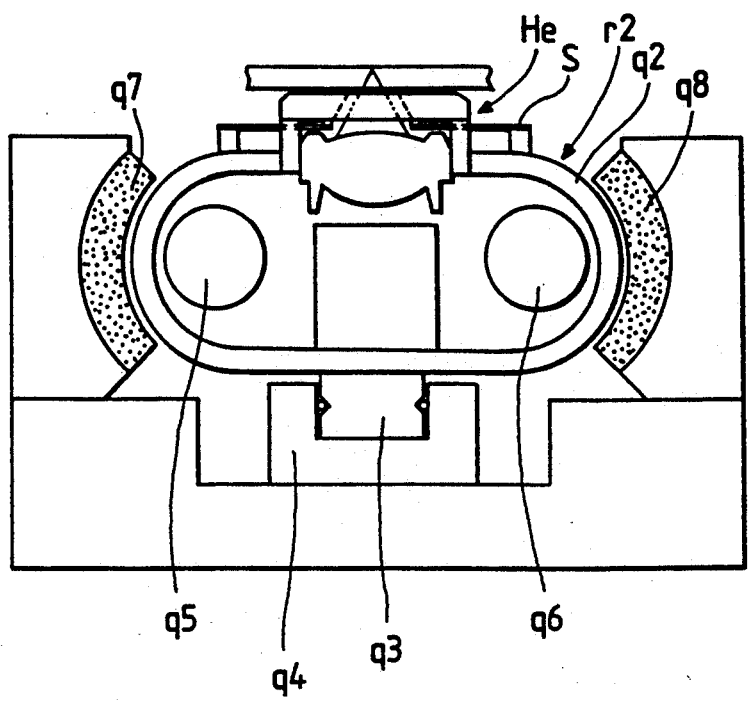
FIG. 21 is a perspective view showing an optical system of a further conventional optical data record/reproduction apparatus.
Figure 22:
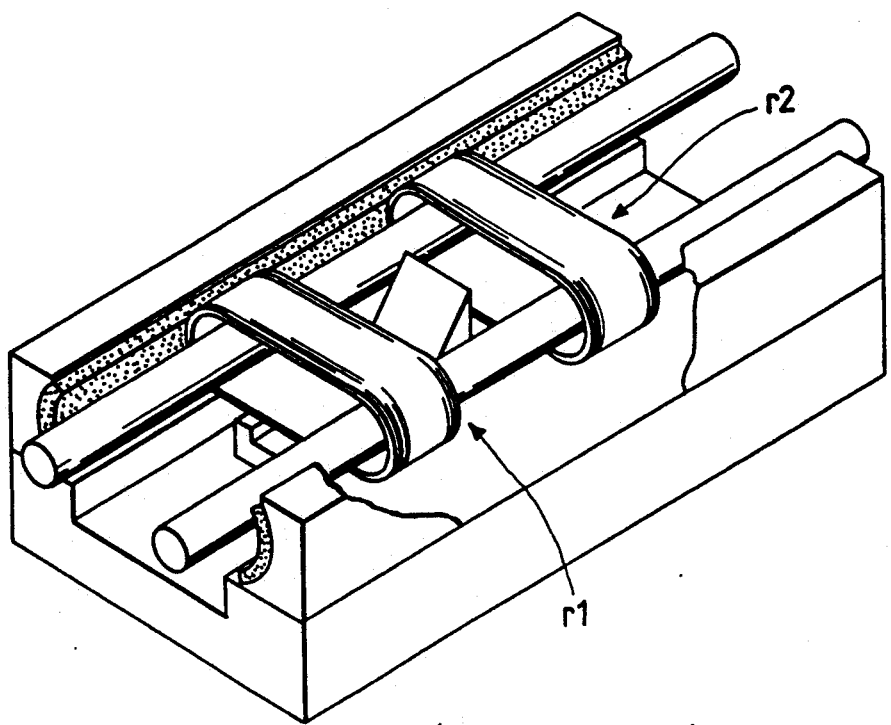
FIG. 22 is a partially broken, cross sectional view showing the conventional optical data record/reproduction apparatus of FIG. 21.
Figure 23:
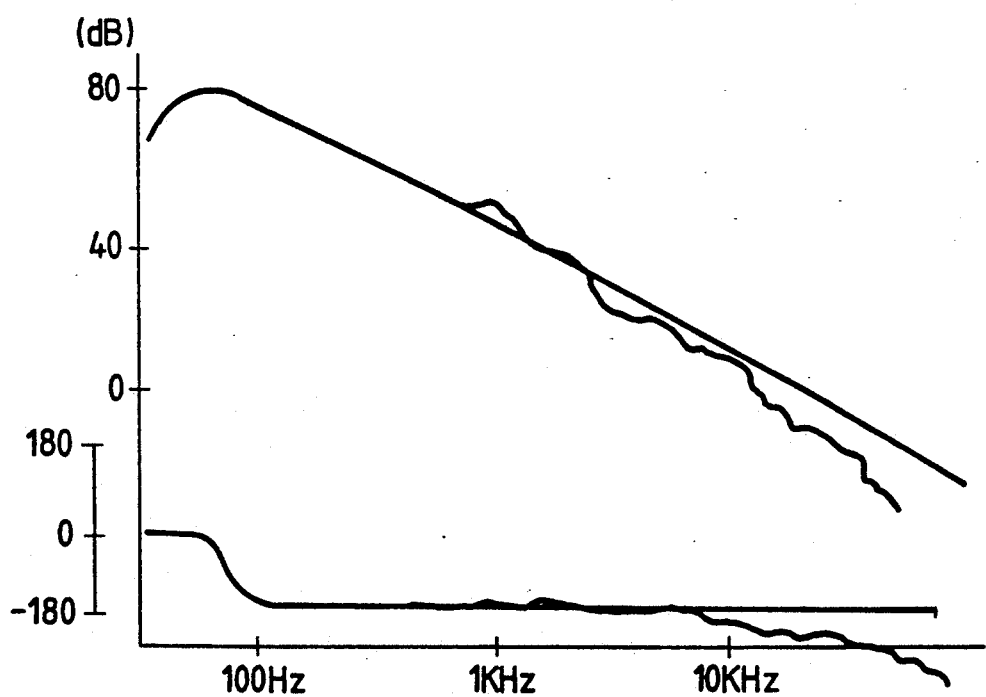
FIG. 23 is a graph showing a frequency characteristic of the conventional optical data record/reproduction apparatus of FIG. 21.

As shown in FIG. 15, an elongated, through-hole 51a may be formed in the carriage 51. Provision of the through-hole 51a realizes the light weight and improved mechanical strength of the carriage 51.

Thus, the linear motion bearing is used to guide the movement of the movable portion in the track direction. Therefore, the guide for moving the movable portion in the track direction is simplified in construction. A decreased number of bearing members may be used, leading to the light weight and efficient assembly of the optical head.

The present invention has thus been constructed and operated. Therefore, the invention successfully provides an optical data record/reproduction apparatus which can move the optical head accurately and at high speed, and realize the light weight and efficient assembly of the optical head.

What is claimed is:

1. An optical data record/reproduction apparatus comprising:
   a movable optical head for reading and/or reproducing data from an optical record medium;
   drive means for driving said movable optical head along a track direction of the optical record medium, said drive means including a drive coil configured as a tubular coil body having a side wall facing the optical record medium, the drive coil further having an opening formed in said side wall and reinforcing coil walls extending inwardly from said opening;
   carriage means for supporting said movable optical head and said drive means, said carriage means being configured to guide the movement of said movable optical head; and
   spring means for supporting said movable optical head on said drive means, said spring means being disposed between said movable optical head and said drive means.

2. The optical data record/reproduction apparatus of claim 1, further comprising:
   an adiabatic member positioned between said movable optical head and said drive coil.

3. The optical data record/reproduction apparatus of claim 2, wherein the coefficient of thermal expansion of said drive coil is substantially equal to the coefficient of thermal expansion of said adiabatic member.

4. The optical data record/reproduction apparatus of claim 1, further comprising:
   reflecting means for reflecting a laser beam emitted from a light source toward said movable optical head, said reflecting means being disposed within the tubular coil body of said drive coil and positioned opposite said opening.

5. The optical data record/reproduction apparatus of claim 4, wherein said carriage means includes a carriage member attached to the tubular coil body, and further wherein a second opening is formed in the tubular coil body proximate said carriage member.

6. The optical data record/reproduction apparatus of claim 5, wherein said reflecting means is disposed directly on said carriage member and within said second opening.

7. The optical data record/reproduction apparatus of claim 6, wherein a sunk portion is formed on said carriage member, and said reflecting means is mounted within said sunk portion on said carriage member.

8. The optical data record/reproduction apparatus of claim 1, wherein said carriage means comprises a linear motion bearing having a carriage ember attached to said drive coil and a bearing member configured to receive said carriage member.

9. The optical data record/reproduction apparatus of claim 8, wherein at least a portion of said linear motion bearing is made of light alloy.

10. The optical data record/reproduction apparatus of claim 8, wherein at least a portion of said linear motion bearing is made of inorganic material.

11. The optical data record/reproduction apparatus of claim 8, wherein said carriage member includes a gap formed therein to reduce the weight of said carriage member.

12. The optical data record/reproduction apparatus of claim 8, wherein ball bearings are disposed between said carriage member and said bearing member, and further wherein a thin film of metal is applied to a contact portion of said carriage member where said ball bearings contact said carriage member.

13. The optical data record/reproduction apparatus of claim 8, wherein an adiabatic member is positioned between said drive coil and said carriage member.

14. The optical data record/reproduction apparatus of claim 1, wherein said reinforcing coil walls define yoke-receiving portions longitudinally extending through the tubular coil body.

15. The optical data record/reproduction apparatus of claim 14, wherein the tubular coil body is elliptical in cross-section, and said reinforcing coil walls are arcuate in shape.

16. An optical data record/reproduction apparatus comprising:
   a movable optical head for reading and/or reproducing data from an optical record medium;
   drive means for driving said movable optical head along a track direction of the optical record medium, said drive means including a drive coil configured as a tubular coil body having a side wall facing the optical record medium, the drive coil further having an opening formed in said side wall and reinforcing coil walls extending inwardly from said opening;
   an adiabatic member positioned between said movable optical head and said drive coil;
   spring means for supporting said movable optical head on said drive means, said spring means being disposed between said movable optical head and said drive means; and
   carriage means for supporting said movable optical head and said drive means, said carriage means being configured to guide the movement of said movable optical head.

17. The optical data record/reproduction apparatus of claim 16, wherein the coefficient of thermal expansion of said drive coil is substantially equal to the coefficient of thermal expansion of said adiabatic member.

18. The optical data record/reproduction apparatus of claim 16, wherein said reinforcing coil walls define yoke-receiving portions longitudinally extending through the tubular coil body.

19. The optical data record/reproduction apparatus of claim 16, further comprising:
   reflecting means for reflecting a laser beam emitted from a light source toward said movable optical head, said reflecting means being disposed within the tubular coil body of said drive coil and positioned opposite said opening.

* * * * *

UNITED STATES PATENT AND TRADEMARK OFFICE
CERTIFICATE OF CORRECTION

PATENT NO. : 5,299,183
DATED : March 29, 1994
INVENTOR(S) : Shoji Yamaguchi

It is certified that error appears in the above-indentified patent and that said Letters Patent is hereby corrected as shown below:

Claim 8, Column 11, Line 67, Change "ember" to
--member--.

Signed and Sealed this

Twenty-seventh Day of December, 1994

Attest:

BRUCE LEHMAN

*Attesting Officer*   *Commissioner of Patents and Trademarks*